(12) United States Patent
Yamada et al.

(10) Patent No.: US 6,497,513 B2
(45) Date of Patent: Dec. 24, 2002

(54) PLAIN BEARING

(75) Inventors: Tatsuo Yamada, Nagoya (JP); Toshiaki Kawachi, Nagoya (JP); Hideo Ishikawa, Nagoya (JP); Takayuki Shibayama, Nagoya (JP)

(73) Assignee: Daido Metal Company Ltd, Nagoya (JP)

( * ) Notice: Subject to any disclaimer, the term of this patent is extended or adjusted under 35 U.S.C. 154(b) by 52 days.

(21) Appl. No.: 09/757,668

(22) Filed: Jan. 11, 2001

(65) Prior Publication Data

US 2001/0024536 A1 Sep. 27, 2001

(30) Foreign Application Priority Data

Mar. 22, 2000 (JP) .................................. 2000-080208

(51) Int. Cl.[7] .............................................. F16C 33/02
(52) U.S. Cl. ..................................................... 384/283
(58) Field of Search ................................ 384/276, 280, 384/282, 283, 284, 291, 292, 293

(56) References Cited

U.S. PATENT DOCUMENTS

| | | | | |
|---|---|---|---|---|
| 1,958,089 A | * | 5/1934 | Leis et al. ................... | 384/283 |
| 2,187,626 A | * | 1/1940 | Merriman ................... | 384/285 |
| 4,400,099 A | * | 8/1983 | Ehrentraut ................... | 384/283 |
| 5,000,586 A | * | 3/1991 | Daxer et al. ................. | 384/282 |
| 5,116,144 A | * | 5/1992 | Kamiya et al. ............. | 384/284 |
| 5,817,397 A | * | 10/1998 | Kamiya et al. ............. | 384/282 |

* cited by examiner

*Primary Examiner*—Thomas R. Hannon
(74) *Attorney, Agent, or Firm*—Browdy and Neimark

(57) ABSTRACT

In order to provide a plain bearing excellent in the anti-seizure property, a bearing metal layer is provided with a plurality of recesses different in depth on the inner surface thereof so as to form an uneven textured portion thereon, the recesses being filled with a soft overlay layer. At the beginning of the use, the overlay layer develops the conformability. When the wear proceeds to the wear level I so that the shallow recesses disappear, an intermediate layer or the bearing metal layer forming protrusions is exposed and form a condition in which the overlay is mixed. Furthermore, when the wear proceeds to the wear level II, the shallow recesses disappear while the deep recesses remain, so that the condition hardly to cause the seizure is maintained.

17 Claims, 4 Drawing Sheets

CIRCUMFERENTIAL DIRECTION

CIRCUMFERENTIAL DIRECTION

PLAIN BEARING

BACKGROUND OF THE INVENTION

1. Field of the Invention

This invention relates to a plain bearing, and more particularly to a plain bearing comprising a bearing metal layer having an uneven textured portion formed on the inner surface thereof, and an overlay layer provided on the inner surface of the bearing metal layer to cover the uneven textured potion.

2. Description of the Related Art

There is known a plain bearing comprising a back metal layer and a bearing metal layer bonded to the back metal layer, which is further provided with an overlay layer made of a soft material such as a Pb—Sn alloy on the surface of the bearing metal layer so as to enhance the conformability and the foreign matter embeddability of the bearing. Moreover, there is also known the above plain bearing further comprising an intermediate layer made from Ni or the like provided between the bearing metal layer and the overlay layer so as to prevent components of the overlay layer from diffusing into the bearing metal layer and improve the adhesiveness of the overlay layer.

In case of the bearings, when the overlay layer wears to expose the hard bearing metal layer or the harder intermediate layer over a wide area, an associated shaft slides directly on the hard layers over the wide area, so that the bearings readily cause the seizure. For the purpose of preventing this, there is also known a plain bearing having groove-like recesses 64 formed on the inner surface of the bearing metal layer 61 by boring in the axial direction, and the intermediate layer 62 and the overlay layer 63 provided on the recesses 64, as shown in FIGS. 7 and 8, so that even when the overlay layer 63 wears to the level M shown in FIG. 7, the soft overlay layer 63 provided in the recesses 64 still exists together with the intermediate layer 62 and the bearing metal layer 61 and form a mixing condition so as not to expose the intermediate layer 62 and the bearing metal layer 61 over a wide area, whereby maintaining the anti-seizure property.

In case of the bearing, if the overlay layer is exposed widely, the fatigue resistance and the wear resistance are deteriorated, while the conformability and the foreign matter embeddability are enhanced. On the contrary, if the bearing metal layer is exposed widely, the conformability and the foreign matter embeddability are deteriorated, namely the anti-seizure property is deteriorated, while the fatigue resistance and the wear resistance are enhanced.

SUMMARY OF THE INVENTION

Since the recesses of the conventional plain bearing have the same depth with each other, when the inner surface of the bearing wears to the bottoms of the recesses especially in a load carrying region, the hard bearing metal layer suddenly becomes exposed in a wide area, so that the bearing readily causes the seizure. Particularly in recent years, there are tendencies to avoid using lead in view of an environmental problem and to harden the bearing metal layer, and thus it has been worried that the seizure is readily caused.

Accordingly, it is an object of the present invention to enhance the anti-seizure property of a plain bearing by providing a plurality of recesses different in depth so as to prevent the bearing metal layer and the overlay layer from being exposed in a wide area suddenly.

According to the invention, there is provided a plain bearing comprising a back metal layer; a bearing metal layer provided on the inner surface of the back metal layer, which has an uneven textured portion formed on the inner surface thereof; and a soft overlay layer provided on the inner surface of the bearing metal layer to fill recesses of the uneven textured portion; wherein the recesses comprise at least two kinds of recesses different in depth.

According to the above feature, the overlay layer covering the uneven textured portion develops the conformability at the beginning of the use. Then, when the inner surface of the plain bearing wears to expose the bearing metal forming protrusions of the uneven textured portion, the overlay layer and the bearing metal layer appear and form a mixing condition. Further, even when those layers wear to the bottoms of the shallower recesses, the deeper recesses remain so that those layers still appear and form a mixing condition. As a result, the bearing metal layer is not exposed over a wide area in a load carrying region, and thus the preferred condition hardly to cause the seizure is maintained.

Typically, the bearing metal layer is made from a Cu or an Al alloy. The overlay layer material may be optionally selected from the group of Pb, a Pb alloy, Sn, a Sn alloy, and a resin suitable for a sliding-contact application, e.g. PTFE and PFA.

Moreover, although the overlay layer may be directly provided on the bearing metal layer, it also may be possible to provide an intermediate layer between the bearing metal layer and the overlay layer so as to enhance the adhesiveness and prevent components of the overlay layer from diffusing into the bearing metal layer. The intermediate layer material may be optionally selected from the group of Ni, Ag, a Ni alloy, an Ag alloy, Cu, a Cu alloy, Co, a Co alloy, Sn, a Sn alloy, Zn and a Zn alloy, for example.

Typically, the overlay layer is made from a lead-tin alloy. However, the overlay layer may be made from another soft material, which does not include lead, such as a resin or a tin base alloy.

According to the invention, it is possible to provide a plain bearing excellent in the anti-seizure property.

With reference to the attached drawings, preferred embodiments of the plain bearing according to the invention will be described herein below.

DESCRIPTION OF THE PREFERRED EMBODIMENTS

A plain bearing half of a first embodiment according to the invention will be described with reference to FIGS. 1 to 5.

In this embodiment, the oil film formed between the bearing and an associated shaft has a minimum thickness (Hmin.) at the center in the circumferential direction on the inner surface of the bearing half 1.

Figure 3:
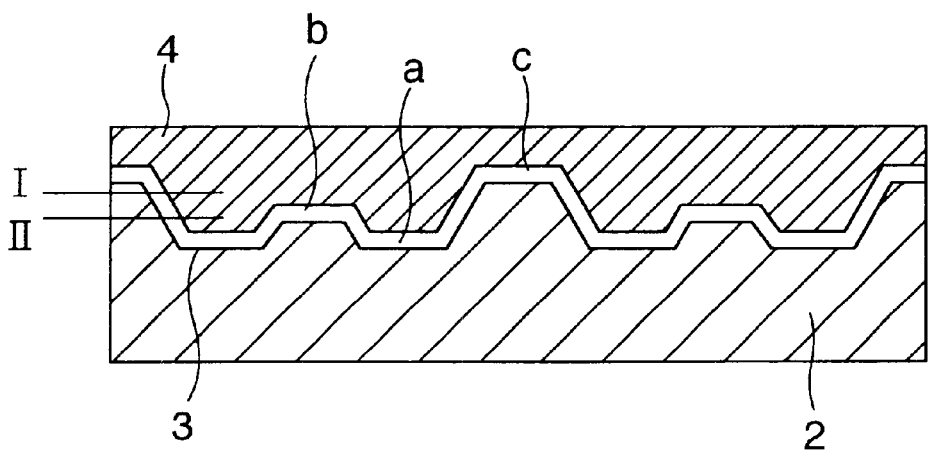
FIG. 3 is an enlarged cross-sectional view taken along a line A—A in FIG. 2.

A back metal layer (not shown) made of a steel and having an outer diameter of 56 mm and a width of 26 mm is provided with a bearing metal layer 2 made from a Cu alloy including 5 mass % Sn and having a thickness of 0.3 mm bonded on the inner surface thereof (see FIG. 3). The bearing metal layer 2 has an uneven textured portion formed on the inner surface thereof within an angle range of 70° (around the axis of the bearing) from the circumferential center toward the respective circumferential ends of the bearing.

Figure 2:
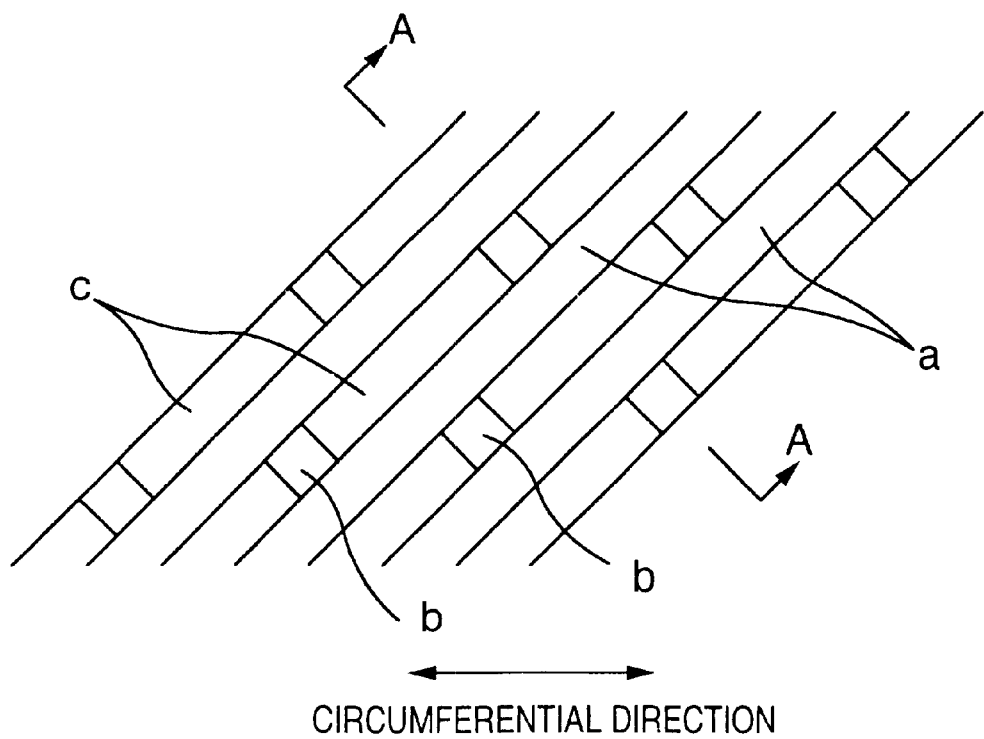
FIG. 2 is an enlarged developed view showing the inner surface of a bearing metal layer.

In the uneven textured portion, groove-like deep recesses "a" which have a depth of 20 μm, a width of 100 μm and an oblique angle of 30° with respect to the circumferential direction are formed and arranged at an interval of 100 μm, as shown in FIG. 2. Between the recesses "a", protrusions "c" having a length of 300 μm in the longitudinal direction of the grooves and shallow recesses "b" having a depth of 5 μm and a length of 150 μm in the longitudinal direction of the grooves are formed and arranged alternately in the longitudinal direction of the grooves, so that two kinds of recesses "a" and "b" different in depth are formed on the inner surface of the bearing metal layer. Moreover, the bearing metal layer having the uneven textured portion comprising the deep recesses "a", the shallow recesses "b" and the protrusions "c" is provided with an intermediate layer 3 made from Ni having a thickness of 1.5 μm on the inner surface thereof. Furthermore, an overlay layer 4 made from a tin alloy is formed on the inner surface of the intermediate layer 3 so as to fill the both of the recesses "a" and "b" and cover the inner surface of the intermediate layer 3 with a thickness of 20 μm from the top of the protrusions "c".

Next, a method of producing the plain bearing half 1 will be described. At first, a bimetal plate, which is formed by bonding a bearing metal layer 2 to a back metal layer, is bent into a half-cylindrical shape by machining (press forming), and thereafter the ends of the curved piece are processed. After pre-treating the obtained bimetal by degreasing by water cleaning, electrolytic degreasing, and pickling in this order, etching is carried out. At the time of the etching, masking is also carried out by pad printing.

Figure 4:
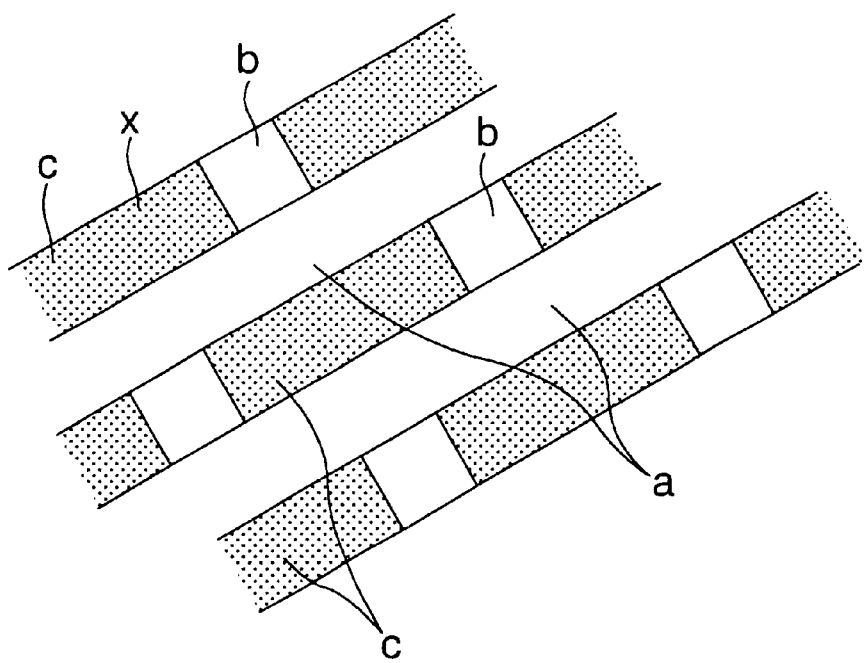
FIG. 4 is an enlarged developed view showing masking portions.

Although the pad printing can provide various shapes of patterns as is well known, the masking X of this embodiment is applied on the portions corresponding to the protrusions "c", which are shown by sprinkled patterns in FIG. 4, so as to form rectangles, each of which has a length of 300 μm and an oblique angle of 30° with respect to the circumferential direction of the plain bearing 1 and arranged at a lateral interval of 100 μm. The masking material used in this embodiment is HER300 (Trademark) excellent in the acid-resistance and the alkali-resistance. The inner surface except for areas to be etched, the outer surface, and the edge surfaces of the plain bearing 1 are also coated by the masking material HER300 (Trademark) having the acid-resistance and the alkali-resistance. After masking the plain bearing 1, a first etching is carried out. In the first etching, electrolytic etching is carried out on the condition of a current density of 2 A/dm$^2$ and a temperature of 20° C. for 5 minutes while immersing in an etching solution including nitric acid of 20 ml/l, hydrochloric acid of 20 ml/l and hydrogen peroxide of 20 ml/l.

As a result of the first etching, the portions corresponding to the deep recesses "a" and the shallow recesses "b" are formed by etching portions which are not coated with the masking material by the pad printing and have a depth of 5 μm (see FIG. 4). On the contrary, the portions coated with the masking material are not etched and thus remain to form elongate protrusions "c" relatively, so that the inner surface of the bearing metal layer 2 turns into an uneven textured surface. Moreover, the etching depth can be optionally adjusted by changing the electrolytic etching condition appropriately.

Figure 5:
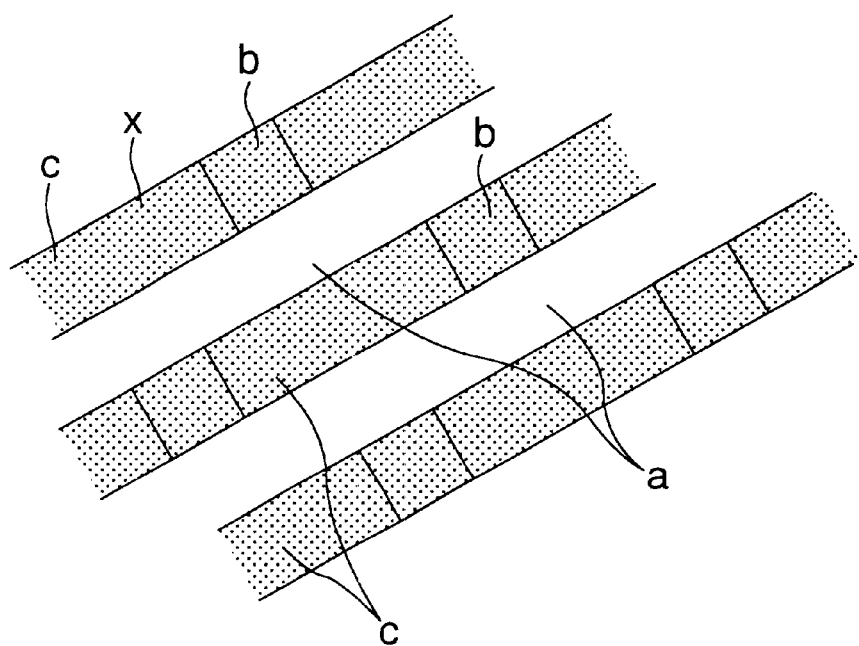
FIG. 5 is an enlarged developed view showing masking portions.

Next, in order to form the deep recesses "a" having a depth of 20 μm, a second etching is carried out after applying making Y on portions corresponding to the protrusions "c" and the shallow recesses "b", which are shown by sprinkled patterns in FIG. 5. Here, the masking Y is applied by the same processes with the pad printing and the electrolytic etching of the first etching. In the second etching, the etching time is elongated. By the etching, only the portions corresponding to the deep recesses "a" are further etched by 15 μm, while the masked protrusions "c" and the masked shallow recesses "b" are not etched, so that the inner surface of the bearing metal layer 2 has an uneven textured portion comprising the deep recesses "a" having a depth of 20 μm, the shallow recesses "b" having a depth of 5 μm, and the protrusions "c".

After removing the masking material and subjecting to electrolytic pickling, an intermediate layer 3 having a thickness of 1.5 μm is formed by Ni plating. As a result, the intermediate layer 3 is formed so as to coat the inner surface of the bearing metal layer having the uneven textured portion. Then, an overlay layer 4 is formed thereon by tin alloy plating, so that the deep recesses "a" and the shallow recesses "b" are filled with the overlay layer 4, and the protrusions "c" are also covered with the overlay layer 4 with a thickness of 20 μm. After that, the obtained plain bearing 1 is subjected to finishing machining, so that the plain bearing half 1 shown in FIG. 1 is completed.

Figure 1:
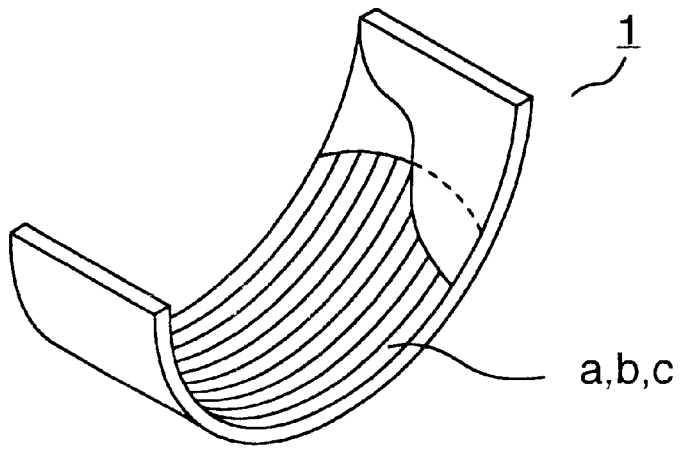
FIG. 1 is a partly-broken perspective view of a plain bearing of a first embodiment according to the invention.

When the plain bearing 1 of the embodiment shown in FIG. 1 is mounted on a housing (not shown) and operated while supporting an associated shaft, at the beginning of the use, the overlay layer 4 is exposed and develops the conformability. Next, when the overlay layer wears to the wear level I shown in FIG. 3 with the lapse of time, the intermediate layer 3 and the bearing metal layer 2 become exposed. At this time, the associated shaft slides on the bearing metal forming the protrusions "c" and the soft overlay 4, namely the hard intermediate layer 3 and the bearing metal layer 2 are not be exposed over a wide area, while the fatigue resistance and the wear resistance are maintained by the bearing metal layer 2. Moreover, the overlay layer 4 provided in the deep recesses "a" and the shallow recesses "b" develops the sufficient foreign matter embeddability and the anti-seizure property. Furthermore, when the conformability is not so necessary, the wear of the inner surface of the plain bearing proceeds to the wear level II, namely to the extent that the shallow recesses "b" disappear, so that the intermediate layer 3 and the bearing metal layer 2 under the shallow recesses are also exposed to increase the exposed area of those layers, thereby the higher fatigue resistance and the higher wear resistance are developed. At this time, the inner surface of the plain bearing 1 shows a stripe pattern in which the overlay layer 4 in the deep recesses "a" and the bearing metal layer 2 are arranged alternately.

Since the deep recesses "a" are the grooves extending substantially in the circumferential direction, even if a hard foreign matter is introduced between the plain bearing 1 and the shaft, the foreign matter is embedded in the overlay layer 4 while being moved in the overlay layer 4 along the deep recess "a" in the circumferential direction in accordance with the rotation of the shaft, so that the overlay layer 4 is prevented from being damaged widely.

Next, a plain bearing half of a second embodiment according to the invention will be described with reference to FIG. 6.

Figure 6:
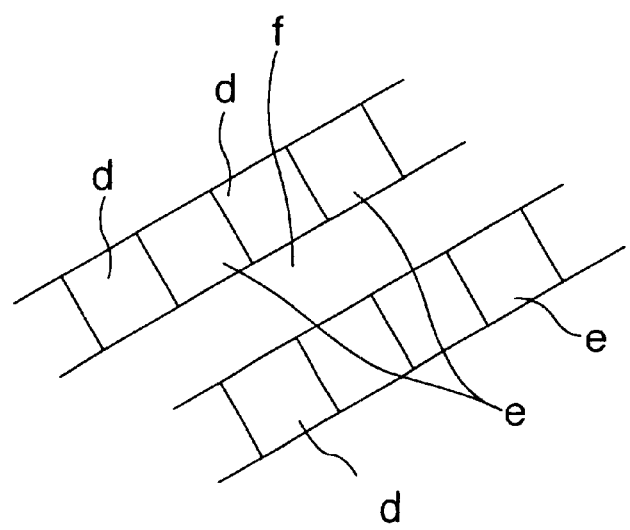
FIG. 6 is an enlarged developed view of the inner surface of a bearing metal layer of a second embodiment according to the invention.
Figure 7:
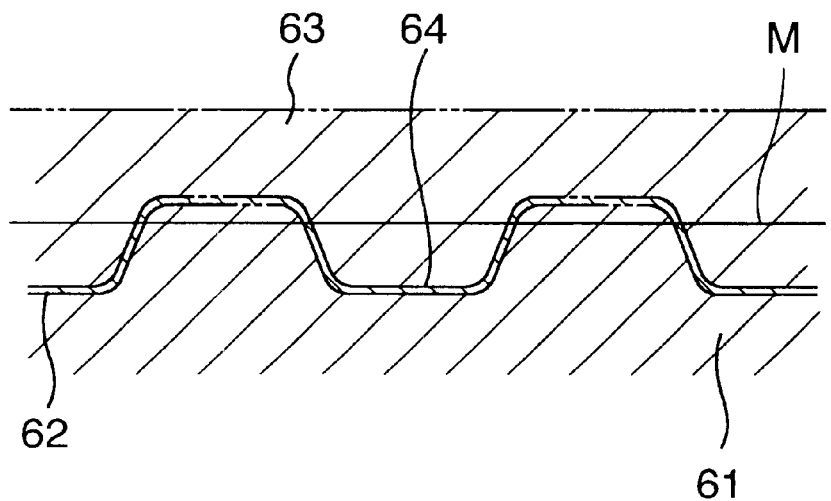
FIG. 7 is an enlarged cross-sectional view of a portion of a conventional plain bearing.
Figure 8:
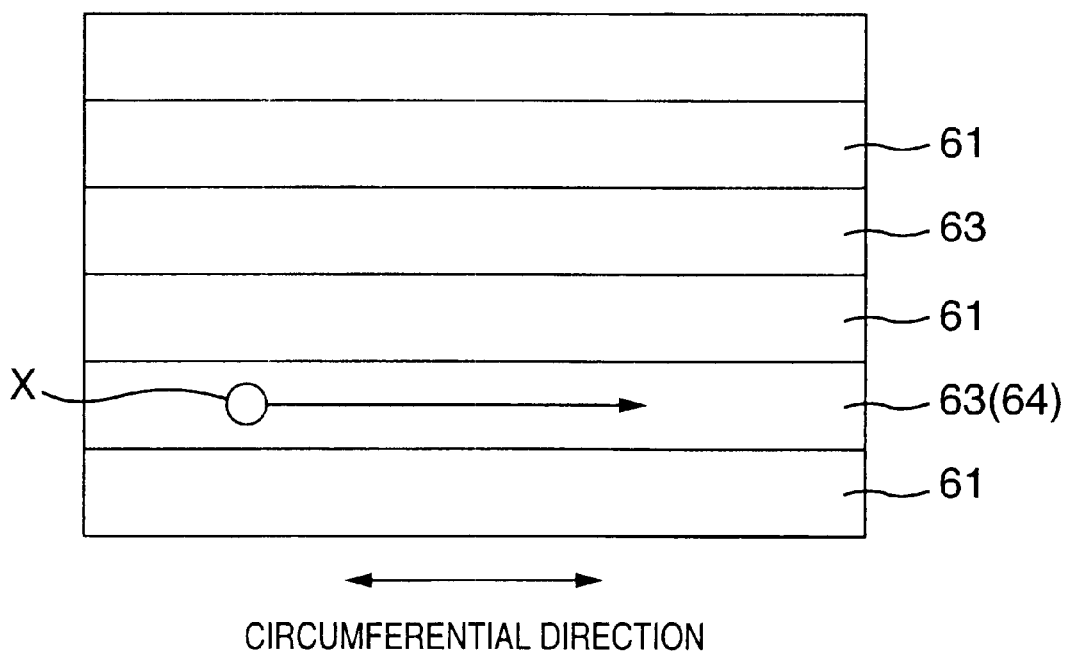
FIG. 8 is a developed view showing the inner surface of the conventional plain bearing which wore to the wear level M shown in FIG. 7.

The second embodiment shows an example of a plain bearing in which the uneven textured portion formed on the inner surface of the bearing metal layer 2 of the first embodiment is changed into the other one as shown in FIG. 6. The plain bearing of the second embodiment has the same composition of the back metal layer, the bearing metal layer 2, the intermediate layer 3 and the overlay layer 4, and the same shape of the plain bearing 1 with those of the first embodiment. In the second embodiment, protrusions "f" having a width of 100 μm are formed straight on the inner surface of the bearing metal layer 2 at an oblique angle of 30° with respect to the circumferential direction of the plain bearing 1. Recesses "d" and "e" are formed between the protrusions "f". The recesses "e", which correspond to shallow recesses substantially forming a square having a depth of 5 μm and a length of 100 μm on a side, and the recesses "d", which correspond to deep recesses forming a square having a depth of 20 μm and a length of 100 μm on a side, are formed on the inner surface of the bearing metal layer so as to provide two kinds of recesses "d" and "e" different in depth. Moreover, the bearing metal layer having the uneven textured portion comprising the deep recesses "d", the shallow recesses "e" and the protrusions "f" is coated with an intermediate layer 3 and covered with an overlay layer 4 so as to fill the recesses.

Also in case of the second embodiment, when the plain bearing 1 mounted on a housing (not shown) and operated, at the beginning of the use, the overlay layer develops the conformability, as with the first embodiment. Moreover, when the overlay layer wears with the lapse of time, the bearing metal layer 21 becomes exposed, so that an associated shaft is supported by the bearing metal layer 2, whereby developing the fatigue resistance and the wear resistance. Further, when the shallow recesses "e" wears, the higher fatigue resistance and the higher wear resistance are developed. At this time, the overlay layer 4 in the remaining deep recesses "d" develops the foreign matter embeddability, thereby the excellent anti-seizure property is obtained.

Although the plain bearings of the first and the second embodiments according to the invention have been described above in detail, the invention is not limited to the embodiments, but various modifications as described below for example can be made without departing from the scope of the invention.

(1) In the first and the second embodiments, although the bearing metal layer is made from a Cu alloy, it may be made from an Al alloy. Moreover, although the overlay layer is made from a Sn alloy, the material of the overlay layer may be optionally selected from a lead-tin alloy and so on.

(2) Although the first embodiment shows an example in which the deep recesses "a" are the recess grooves extending straight at an angle of 30° with respect to the circumferential direction of the plain bearing 1, the recess grooves may be provided straight in the circumferential direction, and may be curved.

(3) In the first and the second embodiments, although the deep recesses "a" and "d" have a depth of 20 μm, those may be formed to have a depth of 10 to 50 μm by optionally selecting the etching condition. Moreover, the shallow recesses "b" and "e" may also have a depth of 3 to 15 μm.

(4) In the first and the second embodiments, although the sliding surface is covered with the overlay layer made from a Sn alloy, the inner surface of the plain bearing may be subjected to finishing machining so as to expose the bearing metal layer 2, so that the bearing metal layer 2 and the overlay layer 4 form a stripe pattern thereon.

What is claimed is:

1. A plain bearing having a cylindrical or half-cylindrical shape, comprising:
   a back metal layer;
   a bearing metal layer provided on the inner surface of the back metal layer, the bearing metal layer having protrusions and recesses formed on the inner surface thereof, the recesses comprising at least two kinds of recesses different in depth; and
   a soft overlay layer provided in the inner surface of the bearing metal layer so as to fill the recesses; wherein
   the recesses have been formed by etching, while masking the protrusions to form the recesses.

2. A plain bearing according to claim 1, further comprising an intermediate layer made from Ni or Ag provided between the bearing metal layer and the overlay layer.

3. A plain bearing according to claim 2, wherein the recesses extend in the circumferential direction of the plain bearing, or in an oblique direction with respect to the circumferential direction of the plain bearing.

4. A plain bearing according to claim 1, wherein the recesses extend in the circumferential direction of the plain bearing, or in an oblique direction with respect to the circumferential direction of the plain bearing.

5. A plain bearing according to claim 1, wherein the soft overlay layer is provided on the inner surface of the bearing metal layer so as to fill the recesses and cover the protrusions.

6. A plain bearing according to claim 1, wherein said two kinds of recesses different in depth comprise shallow recesses having a depth of 3–15 μm and deep recesses which are deeper than said shallow recesses and have a depth of 10–50 μm.

7. A plain bearing according to claim 6, wherein said deep recesses are about four times the depth of said shallow recesses.

8. A plain bearing according to claim 1, wherein said two kinds of recesses different in depth comprise deep recesses and shallow recesses, said shallow recesses having a generally square configuration.

9. A plain bearing having a cylindrical or half-cylindrical shape, comprising:
   a back metal layer;
   a bearing metal layer provided on the inner surface of the back metal layer which has an uneven textured portion formed on the inner surface thereof; and
   a soft overlay layer provided in the inner surface of the bearing metal layer to fill recesses of the uneven textured portion; wherein
   the recesses comprise at least two kinds of recesses different in depth; wherein
   the uneven textured portion comprises the shallower recesses and the deeper recesses disposed alternately.

10. A plain bearing according to claim 9, wherein the recesses are formed by etching.

11. A plain bearing according to claim 9, wherein the recesses extend in the circumferential direction of the plain bearing, or in an oblique direction with respect to the circumferential direction of the plain bearing.

12. A plain bearing according to claim 11, wherein the recesses are formed by etching.

13. A plain bearing having a cylindrical or half-cylindrical shape, comprising:

a back metal layer;

a bearing metal layer provided on the inner surface of the back metal layer which has an uneven textured portion formed on the inner surface thereof; and a soft overlay layer provided in the inner surface of the bearing metal layer to fill recesses of the uneven textured portion;

an intermediate layer made from Ni or Ag provided between the bearing metal layer and the overlay layer; wherein the recesses comprise at least two kinds of recesses different in depth;

wherein the uneven textured portion comprises the shallower recesses and the deeper recesses disposed alternately.

14. A plain bearing according to claim 13, wherein the recesses are formed by etching.

15. A plain bearing according to claim 13, wherein the recesses extend in the circumferential direction of the plain bearing, or in an oblique direction with respect to the circumferential direction of the plain bearing.

16. A plain bearing according to claim 15, wherein the recesses are formed by etching.

17. A plain bearing having a cylindrical or half-cylindrical shape, comprising:

a back metal layer;

a bearing metal layer provided on the inner surface of the back metal layer, the bearing metal layer having protrusions and etched recesses formed on the inner surface thereof, the etched recesses comprising at least two kinds of etched recesses different in depth; and a soft overlay layer provided in the inner surface of the bearing metal layer so as to fill the etched recesses; wherein the etched recesses comprise a series of first etched recesses having a first depth, and a series of second etched recesses having a second depth.

* * * * *